(12) United States Patent
Yoshida et al.

(10) Patent No.: US 6,696,199 B2
(45) Date of Patent: Feb. 24, 2004

(54) BATTERY

(75) Inventors: Hiroaki Yoshida, Kyoto (JP);
Takefumi Inoue, Kyoto (JP);
Nobutaka Imamura, Kyoto (JP);
Tatsuya Iwamoto, Kyoto (JP); Taro Naoi, Kyoto (JP); Naozumi Miyanaga, Kyoto (JP); Teruhiro Hatanaka, Kyoto (JP); Masaru Sashiki, Osaka (JP);
Kouji Kamata, Osaka (JP); Hideki Yamazaki, Osaka (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 10/352,938

(22) Filed: Jan. 29, 2003

(65) Prior Publication Data

US 2003/0143460 A1 Jul. 31, 2003

(51) Int. Cl.⁷ .................................................. H01M 2/30
(52) U.S. Cl. ........................ 429/182; 429/181; 429/184
(58) Field of Search ................................. 429/181, 182, 429/183, 184

(56) References Cited

U.S. PATENT DOCUMENTS

| 6,268,079 | B1 | 7/2001 | Inoue et al. | |
| 6,335,117 | B1 | 1/2002 | Yoshida et al. | |
| 2003/0124420 | A1 * | 7/2003 | Fong et al. | 429/181 |

* cited by examiner

*Primary Examiner*—John S. Maples
(74) *Attorney, Agent, or Firm*—Wenderoth, Lind & Ponack, L.L.P.

(57) ABSTRACT

An insulating sleeve 6 made of ceramic hermetically fixed into an opening in a terminal supporting plate 7 in a battery sheath made of metal, a positive terminal 4 made of an aluminum alloy or negative terminal 5 made of a copper alloy is inserted in the insulating sleeve, and a metallic ring is fitted over the positive terminal 4 or negative terminal 5. The inner edge of the metallic ring 11 and the positive terminal 4 or negative terminal 5 are hermetically fixed to each other by an aluminum-based brazing metal 8 or copper-based brazing metal 9, and the outer edge of the metallic ring 11 and the insulating sleeve 6 are hermetically fixed to each other by an aluminum-based brazing metal 8 or copper-based brazing metal 9.

17 Claims, 12 Drawing Sheets

BATTERY

BACKGROUND OF THE INVENTION

1. Field of the Invention

The present invention relates to a battery having a terminal and a ceramic insulating sleeve.

2. Description of the Prior Art

FIG. 17 shows an example of a structure of a conventional ceramic hermetic seal for a non-aqueous electrolyte secondary battery. The non-aqueous electrolyte secondary battery comprises a winding type of elliptic-cylindrical electric power generating element 1, an elliptic-cylindrical metallic case 2 that houses the electric power generating element 1, and an elliptic lid plate 3 that is hermetically fixed to the metallic case 2 in such a manner that it is fitted into an upper opening of the metallic case 2 and welded thereto.

A positive terminal 4 and a negative terminal 5 connected to a positive electrode and a negative electrode, respectively, of the electric power generating element 1 each have a terminal supporting plate 7 attached thereto via an insulating sleeve 6 made of ceramic.

As shown in FIG. 18, the positive terminal 4 is hermetically fixed to the cylindrical insulating sleeve 6 in such a manner that it is inserted therein, and the corner formed by the positive electrode 4 and the upper surface of the insulating sleeve 6 is sealed with a brazing metal 8. In turn, the insulating sleeve 6 is hermetically fixed to the terminal supporting plate 7 in such a manner that it is inserted in an opening in the terminal supporting plate 7, and the gap therebetween is sealed with a brazing metal 10.

The positive terminal 4 is made of an aluminum alloy that is not dissolved in a non-aqueous electrolyte at a potential of the positive electrode. An aluminum or aluminum-alloy-based brazing metal 8 is used for brazing between the positive terminal 4 and the insulating sleeve 6, because the brazing metal will have the same potential as the positive terminal.

Since the terminal supporting plate 7 is insulated from the positive electrode, it may be made of an aluminum alloy, stainless steel, nickel-plated iron or the like. The brazing metal 10 between the terminal supporting plate 7 and the insulating sleeve 6 may be appropriately selected, not being limited to the aluminum or aluminum-alloy-based brazing metal.

On the other hand, as shown in FIG. 19, the negative terminal 5 is hermetically fixed to the cylindrical insulating sleeve 6 in such a manner that it is inserted therein, and the gap between the negative electrode 5 and the insulating sleeve 6 is sealed with a brazing metal 9. In turn, the insulating sleeve 6 is hermetically fixed to the terminal supporting plate 7 in such a manner that it is inserted in an opening in the terminal supporting plate 7, and the gap therebetween is sealed with the brazing metal 10.

The negative terminal 5 is made of a copper alloy, nickel alloy or the like, which is not susceptible to electrochemical corrosion at a potential of the negative electrode. A copper-alloy-based brazing metal 9, such as a gold-copper brazing, is used for brazing between the negative terminal 5 and the insulating sleeve 6, because the brazing metal will have the same potential as the negative terminal 5.

Since the terminal supporting plate 7 is insulated from the negative electrode, it may be made of an aluminum alloy, stainless steel, nickel-plated iron or the like. The brazing metal 10 between the terminal supporting plate 7 and the insulating sleeve 6 is the same as that of the positive terminal 4.

The terminal supporting plates 7 each having the positive terminal 4 or negative terminal 5 hermetically fixed thereto via the insulating sleeve 6 are hermetically fixed to the lid plate 3 in such a manner that they are inserted in openings at both ends of the lid plate and welded thereto. Then, the electric power generating element 1 mounted below the lid plate 3 is inserted in the metallic case 2, and the lid plate 3 is fitted into the upper opening of the metallic case 2 and welded thereto. In this way, the battery sheath is sealed.

The ceramic material used for the insulating sleeve 6 has a coefficient of thermal expansion that is extremely lower than that of the aluminum alloy used for the positive terminal 4, and is quite lower than that of the copper alloy used for the negative terminal 5.

Accordingly, a battery, such as a non-aqueous electrolyte secondary battery, having such a conventional ceramic hermetic seal structure has a problem in that a distortion may occur between the positive terminal 4 or negative terminal 5 and the insulating sleeve 6 due to a variation of temperature, and the distortion stress may be concentrated in the insulating sleeve 6 to cause a crack in the ceramic material, resulting in a degradation of air tightness of the battery sheath.

Thus, the positive terminal 4, which has a coefficient of thermal expansion especially largely different from that of the insulating sleeve, has been devised in terms of arrangement. That is, the brazing metal 8 is prevented from entering into the gap between the positive terminal 4 and the insulating sleeve 6 in order for the insulating sleeve 6 to be affected by expansion or shrinkage of the positive terminal 4 as little as possible, as shown in FIG. 18. However, such an arrangement could not completely prevent a crack from occurring in the ceramic insulating sleeve 6.

The stress of the distortion between the positive terminal 4 or negative terminal 5 and the insulating sleeve 6 may also be concentrated in the brazing metal 8 or 9 to cause a crack in the brazing material. A detailed research concerning why the crack occurs in the brazing material has proved that, when the brazing material applied to the terminal is cooled, a void is produced in the brazing material due to volumetric shrinkage of the brazing material, and the void causes occurrence of a crack.

If a crack exists in the brazing material, a problem may arise in that the crack develops to pierce through the brazing material, thereby degrading air tightness of the battery sheath. In such a case, there is an additional problem in that water is introduced into the battery and reacts with an active material (lithium if the battery is a lithium secondary battery, for example) to reduce the battery capacity or increase the internal resistance of the battery, which leads to decrease of the life of the battery.

SUMMARY OF THE INVENTION

The present invention has been devised to address such a circumstance. An object of the invention is to provide a battery having a terminal structure adapted to prevent an insulating sleeve or brazing metal from being damaged by a distortion caused by a difference in coefficient of thermal expansion between the metallic terminal and the insulating sleeve made of ceramic.

A battery according to the invention comprises: an insulating sleeve made of ceramic hermetically fixed into an opening in a battery sheath made of metal; a metallic terminal inserted in the insulating sleeve; and a metallic ring fitted over the metallic terminal. The metallic ring and the metallic terminal are hermetically fixed to each other by a brazing metal and the metallic ring and the insulating sleeve made of ceramic are hermetically fixed to each other by a brazing metal.

According to the arrangement, the metallic terminal and the insulating sleeve made of ceramic are fixed to each other via the metallic ring. Therefore, even if when the temperature varies, a dimension of the gap between the terminal and the insulating sleeve changes to cause a distortion due to the difference in coefficient of thermal expansion between metal and ceramic, the distortion can be accommodated by the metallic ring being deflected. Thus, a crack can be prevented from occurring in the insulating sleeve with reliability.

Preferably, the metallic ring is fixed to support the metallic terminal at an upper end face and/or lower end face of the insulating sleeve.

This can improve reliability of the terminal structure because the metallic ring also supports the metallic terminal, so that the metallic terminal is prevented from staggering.

Preferably, the metallic ring is fixed to the upper end face of the insulating sleeve that is exposed to the outside of the battery sheath.

This decreases the possibility that the brazing material is corroded, because the metallic ring is fixed to the outside of the battery sheath and the possibility that the brazing on the metallic ring is brought into contact with the electrolyte. As a result, the range of choices of the brazing material can be extended.

Preferably, a film made of a protective material having a corrosion resistance is formed on at least a surface of the metallic ring, the surface being exposed to the inside of the battery sheath, and/or at least a surface of the brazing metal for hermetically fixing the metallic ring, the surface being exposed to the inside of the battery sheath.

This arrangement can prevent the metallic ring or brazing metal at a potential of the positive or negative electrode from being corroded if it comes into contact with the electrolyte, because the surface of the metallic ring or brazing metal that is exposed to the inside of the battery sheath is covered with the film made of a protective material. As a result, the battery life can be prevented from decreasing due to a degraded air tightness. Here, the surface of only one of the metallic ring and the brazing metal which is inferior in corrosion resistance to the other may be covered with the film made of a protective material.

Preferably, a gap between the metallic terminal and the insulating sleeve is filled with a protective filler having a corrosion resistance, the gap being located to the inner side of the battery sheath compared to the parts of the metallic ring which is hermetically fixed to the metallic terminal and the insulating sleeve.

With this arrangement, since the protective filler is provided in the gap between the metallic terminal and the insulating sleeve, the metallic ring located on the outer side of the protective filler can be prevented from being brought in to contact with the electrolyte. Thus, the possibility that the metallic ring at the potential of the positive or negative electrode is corroded is eliminated, and the battery life can be prevented from decreasing due to a degraded air tightness. In addition, since the brazing metal for hermetically fixing the metallic ring to the metallic terminal and the insulating sleeve is not brought into contact with the electrolyte, the possibility that the brazing metal is corroded is also eliminated.

Preferably, at least a surface of the metallic ring that is exposed to the outside of the battery is covered with the brazing metal, so that the metallic ring is encapsulated in the brazing.

A research by the inventors has proved that voids (shrinkage cavities) are produced in the brazing material, not on the surface thereof.

This arrangement can suppress the void occurrence, because the metallic ring is disposed in the brazing where voids tend to occur and the brazing material is blocked from entering there.

Thus, the strength of the brazing is improved, and even when a distortion occurs due to a variation of temperature, a crack can be prevented from occurring in the brazing with reliability. When such an arrangement is applied to the brazing on the positive terminal, a significant effect of preventing crack occurrence can be provided.

Preferably, the metallic ring is a substantially right triangular in cross section.

In this case, the substantially-right-angled corner of the metallic ring conforms to the corner formed by the insulating sleeve and the metallic terminal protruding therefrom. In addition, since the outer surface of the metallic ring is inclined, the metallic ring can be placed without protruding.

Thus, the battery can have a more compact terminal structure.

DETAILED DESCRIPTION OF EMBODIMENTS

Now, embodiments of the invention will be described with reference to the drawings.

[First Embodiment]

A first embodiment of the invention will be described with reference to FIGS. 1 to 4.

An insulating seal (ceramic hermetic seal) arrangement for a positive terminal 4 or negative terminal 5 according to this embodiment is used for a non-aqueous electrolyte secondary battery similar to the conventional battery described above.

Figure 17:
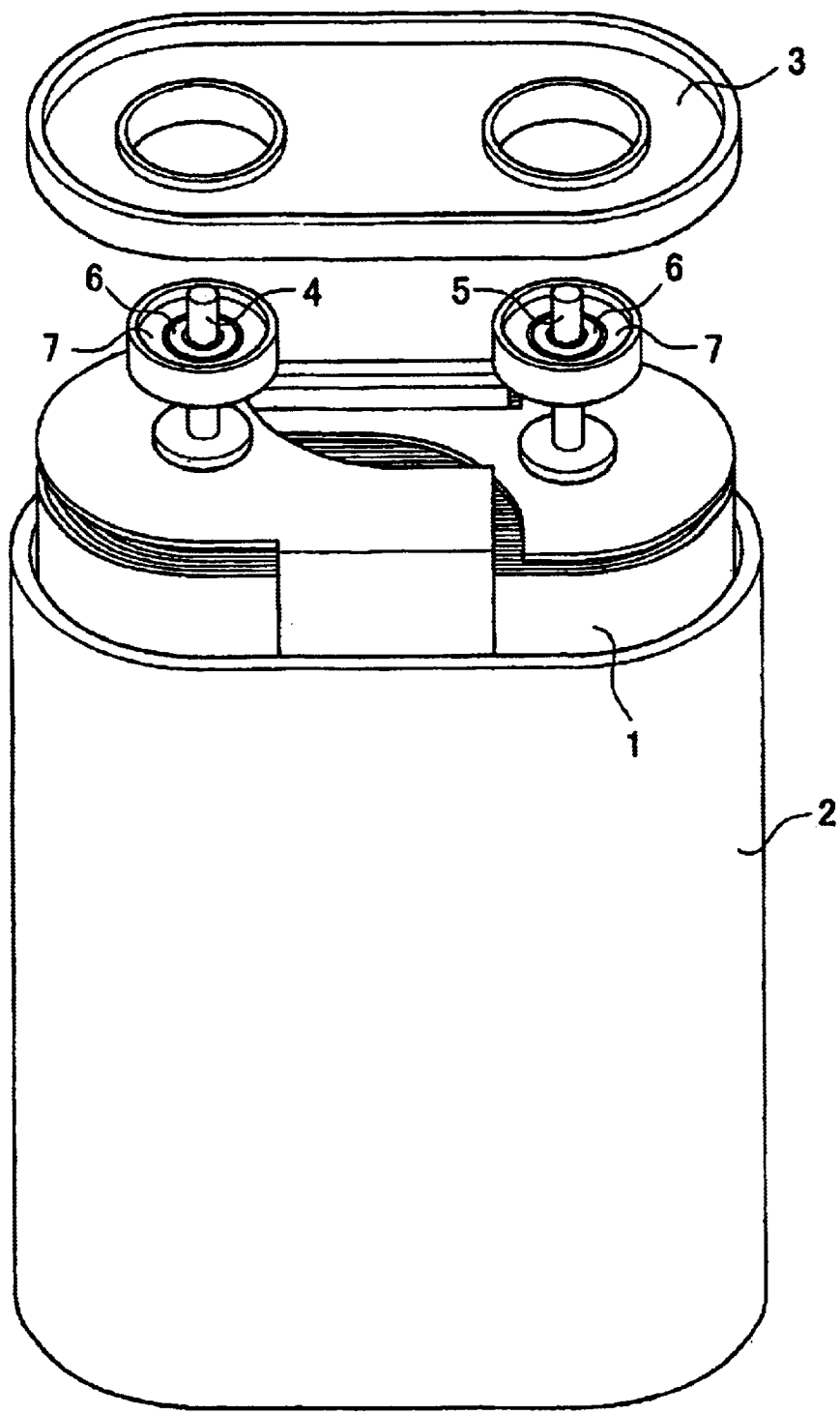
FIG. 17 is a perspective view for illustrating assembly of a non-aqueous electrolyte secondary battery according to prior art.
Figure 18:
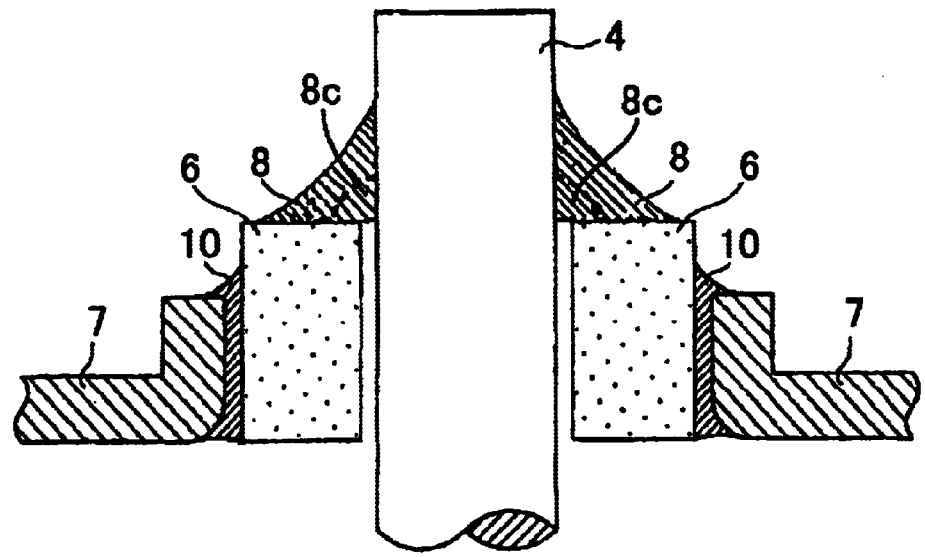
FIG. 18 is a partially enlarged longitudinal cross-sectional view of an insulating seal arrangement for a positive terminal of the battery according to prior art.

The sheath of the non-aqueous electrolyte secondary battery is essentially the same as that of the conventional battery shown in FIG. 17, and thus, it is not illustrated. Referring to FIG. 17, it comprises an elliptic-cylindrical metallic case 2, a lid plate 3 that is hermetically fixed to the metallic case 2 in such a manner that it is fitted into an upper opening of the metallic case 2 and welded thereto, and terminal supporting plates 7, 7 that are hermetically fixed to the lid plate 3 in such a manner that they are fitted into openings in the lid plate 3 and welded thereto. The positive terminal 4 is hermetically fixed to one of the terminal supporting plates 7 via an insulating sleeve 6, and the negative terminal 5 is hermetically fixed to the other of the terminal supporting plates 7 via an insulating sleeve 6.

Each insulating sleeve 6 is hermetically fixed to one terminal supporting plate 7 in such a manner that it is inserted in an opening in the terminal supporting plate 7 and the seam is brazed with a brazing metal 10.

Figure 1:
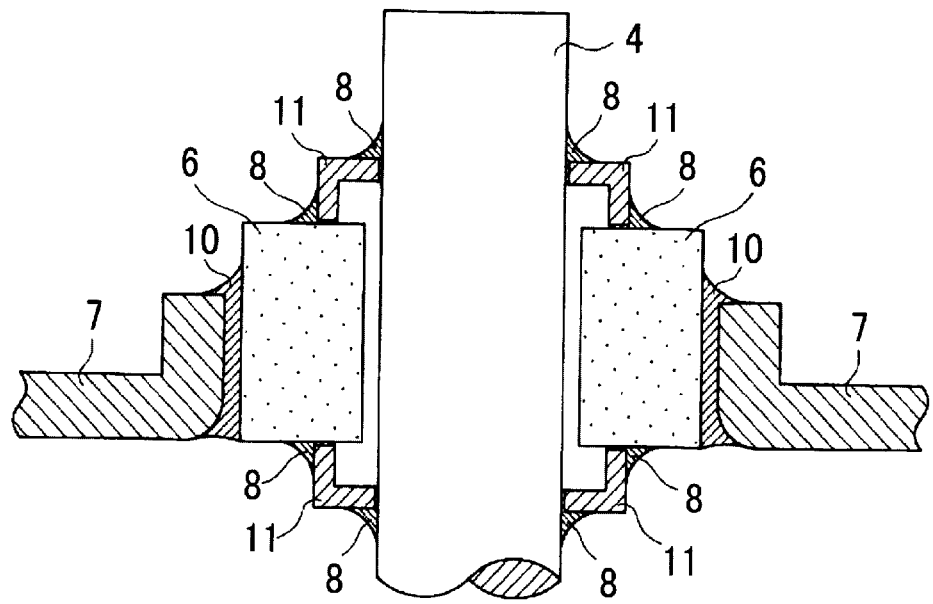
FIG. 1 is a partially enlarged longitudinal cross-sectional view of an insulating seal arrangement for a positive terminal of a non-aqueous electrolyte secondary battery according to a first embodiment of the invention.

As shown in FIG. 1, the positive terminal 4 is inserted in the ceramic insulating sleeve 6 from the bottom and protrudes above and below the insulating sleeve 6 in a state where the insulating seal arrangement is assembled.

The positive terminal 4 is a cylindrical pin made of aluminum, an aluminum alloy, titanium or a titanium alloy, which is not dissolved in the non-aqueous electrolyte at a potential of a positive electrode. As in the case of the non-aqueous electrolyte secondary battery shown in FIG. 17, a lower end of the positive terminal 4 is welded to a current collecting plate connected to the positive electrode of an electric power generating element 1.

The ceramic insulating sleeve 6 is made of 99% alumina, which is characterized by a high corrosion resistance to the non-aqueous electrolyte. Areas of the insulating sleeve 6 to which the brazing metals 8 and 10 are applied are each covered with a metalized layer. The material of the insulating sleeve 6 may be any ceramic and is not limited to particular ones. For example, it may be made of ceramic, such as 92% alumina and 96% alumina.

Figure 3:
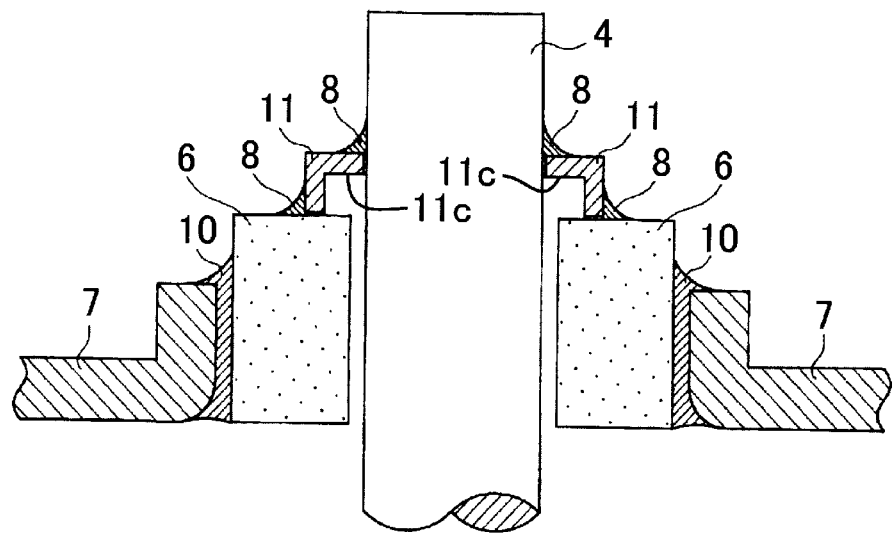
FIG. 3 is a partially enlarged longitudinal cross-sectional view of an insulating seal arrangement for the positive terminal according to the first embodiment of the invention, the arrangement including only one metallic ring disposed outside.
Figure 4:
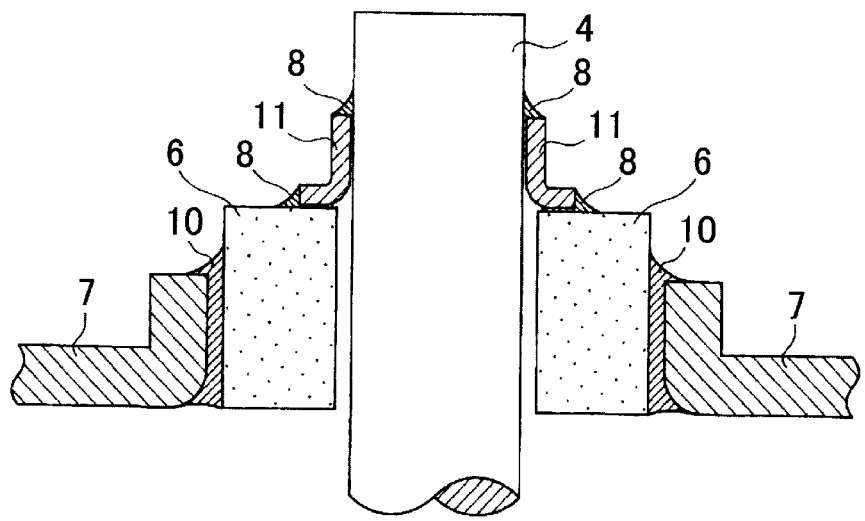
FIG. 4 is a partially enlarged longitudinal cross-sectional view of an insulating seal arrangement for the positive terminal according to the first embodiment of the invention, the arrangement including only one metallic ring different in shape from those in FIG. 1 disposed outside.

Metallic rings 11, 11 are fitted over the positive terminal 4 from above and below and disposed to face upper and lower surfaces of the insulating sleeve 6, respectively. As shown in FIGS. 3 and 4, only one metallic ring may be disposed on one of the end faces of the insulating sleeve 6. However, if the metallic rings 11 are disposed on both the end faces of the insulating sleeve 6, the outer one of the metallic rings 11 is not brought into contact with the non-aqueous electrolyte, and thus, a brazing metal that is readily applied and has a high strength can be used.

The lower metallic ring 11 is fitted over the positive terminal 4 before the positive terminal 4 is inserted in the insulating sleeve 6, and the upper metallic ring 11 is fitted over the positive terminal 4 after the positive terminal 4 is inserted in the insulating sleeve 6.

An inner edge of each metallic ring 11 and the positive terminal 4 are brazed to each other with the brazing metal 8, and an outer edge of each metallic ring 11 and the insulating sleeve 6 are also brazed to each other with the brazing metal 8. The brazing metal 8 is preferably aluminum. However, it is not limited to this, and various kinds of aluminum alloys may be used according to the type of the battery.

The metallic ring 11 is L-shaped in cross section, which is formed by bending inwardly a section of a metallic cylinder close to one edge thereof substantially at a right angle. A distortion of the metallic ring 11 having a cross section of an L-shape due to a variation of temperature is accommodated primarily by each side, in cross section, of the metallic ring 11 being deflected. Therefore, the metallic ring 11 preferably has sides as long as possible.

Now, the material of the metallic ring 11 will be described. Since the metallic ring 11 is needed to accommodate distortions occurring between the positive terminal 4 and the insulating sleeve 6, it is needed that it can be deformed to some extent. On the other hand, in view of the fact that the metallic ring 11 supports the positive terminal 4, it is preferred that the metallic ring 11 is not significantly deformed by external force. Therefore, the metallic ring 11 is preferably made of a metallic material that can be slightly deformed.

In addition, if the metallic ring 11 is significantly expanded or shrunk when the metallic ring 11 is heated or cooled in brazing of the edges thereof, a crack is likely to occur at the areas of brazing. Therefore, the coefficient of thermal expansion of the metallic ring 11 is preferably low.

Furthermore, it is necessary that the metallic ring 11 is not dissolved in the non-aqueous electrolyte at the potential of the positive electrode, as is the case with the positive terminal 4.

Furthermore, the metallic ring 11 is preferably susceptible to elastic deformation, because an excessive plastic deformation leads to a decrease in strength.

Taking these points into consideration, the metallic ring 11 is preferably made of aluminum, an aluminum alloy, titanium, a titanium alloy, kobar, 42% nickel-iron alloy or stainless steel. Kobar is an iron-nickel-cobalt alloy that has a coefficient of thermal expansion substantially equal to that of ceramic. Stainless steel, such as SUS430, SUS304 and SUS316, has a coefficient of thermal expansion intermediate between ceramic and aluminum. In the case where the positive active material is a material that provides an electropositive potential higher than that of lithium by 4 V or more, kobar and stainless steel will be dissolved, and thus, aluminum or an aluminum alloy is preferably adopted.

Although not shown, the negative terminal 5 also is hermetically fixed to the insulating sleeve via a metallic ring, as is the case with the positive terminal 4. The negative terminal is a cylindrical pin as is the case with the positive terminal 4. However, it is made of copper, a copper alloy, nickel or a nickel alloy, which is not susceptible to electrochemical corrosion at a potential of the negative electrode.

The negative terminal 5 and an inner edge of the metallic ring are brazed to each other with the brazing metal, and an outer edge of the metallic ring and the insulating sleeve are also brazed to each other with the brazing metal. The brazing metal is copper-alloy based material, specifically, an alloy containing copper, such as silver-copper (Ag—Cu) alloy and gold-copper (Au—Cu) alloy.

For the same reasons as in the case of the metallic ring 11 at the positive terminal 4 described above, the metallic ring 11 at the negative terminal 5 is preferably made of a metallic material that can be slightly deformed, has a low coefficient of thermal expansion, is not dissolved in the non-aqueous electrolyte at the potential of the negative electrode and is susceptible to elastic deformation.

Taking these points into consideration, the metallic ring at the negative terminal 5 is preferably made of copper, a copper alloy, nickel, a nickel alloy, kobar, 42% nickel-iron alloy, stainless steel including SUS430, SUS304 and SUS316, or nickel-plated iron.

In the arrangement described above, the positive terminal 4 made of an aluminum alloy or the like and the negative terminal 5 made of a copper alloy or the like are fixed to the ceramic insulating sleeve 6 via the metallic rings 11. Thus, even if, when the temperature varies, a dimension of the gap between the positive terminal 4 or negative terminal 5 and the insulating sleeve 6 changes to cause a distortion due to the difference in coefficient of thermal expansion between the aluminum or copper alloy and ceramic, the distortion can be accommodated by the metallic ring 11 being deflected. Thus, a crack can be prevented from occurring in the insulating sleeve 6 with reliability.

Especially if the positive terminal 4 is made of aluminum or an aluminum alloy that has a coefficient of thermal expansion two or more times as high as that of titanium or a titanium alloy, the effect of preventing crack occurrence is significant.

Figure 2:
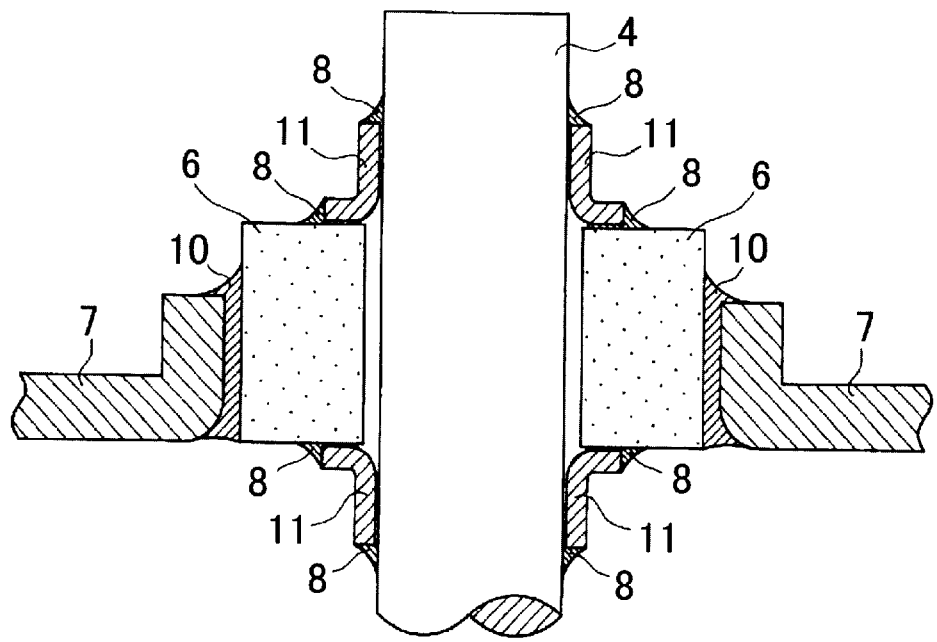
FIG. 2 is a partially enlarged longitudinal cross-sectional view of an insulating seal arrangement for the positive terminal according to the first embodiment of the invention, the arrangement including metallic rings different in shape from those in FIG. 1.

The metallic ring 11 that is L-shaped in cross section, which is formed by bending inwardly a section of a metallic cylinder close to one edge thereof, has been described so far. However, as shown in FIGS. 2 and 4, the metallic ring 11 that is L-shaped in cross section, which is formed by bending outwardly a section of the metallic cylinder close to one edge thereof, may be used.

[Second Embodiment]

Now, a second embodiment of the invention will be described with reference to FIGS. 5 and 6. The same components as in the first embodiment are assigned the same reference numerals and any overlap of description thereof will be avoided. Differences between the embodiments will be described.

In general, ceramics used for the insulating sleeve 6 are characterized by the lower tensile strength and the higher resistance to compression force.

Figure 19:
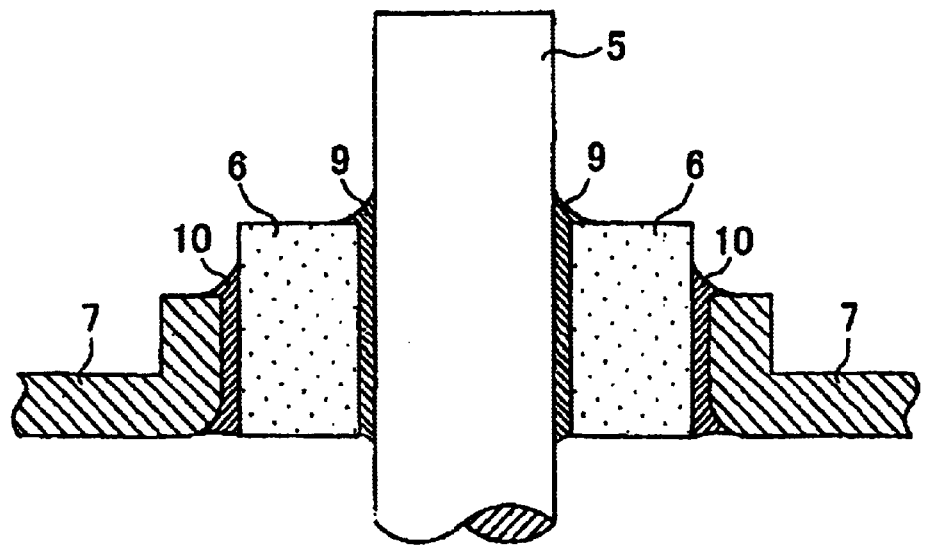
FIG. 19 is a partially enlarged longitudinal cross-sectional view of an insulating seal arrangement for a negative terminal of the battery according to prior art.

In the conventional arrangement shown in FIG. 19, for example, when the negative terminal 5 that has been thermally expanded is to be shrinked, the insulating sleeve 6 is subject to a tensile load, and a crack occurs in the insulating sleeve 6.

Figure 5:
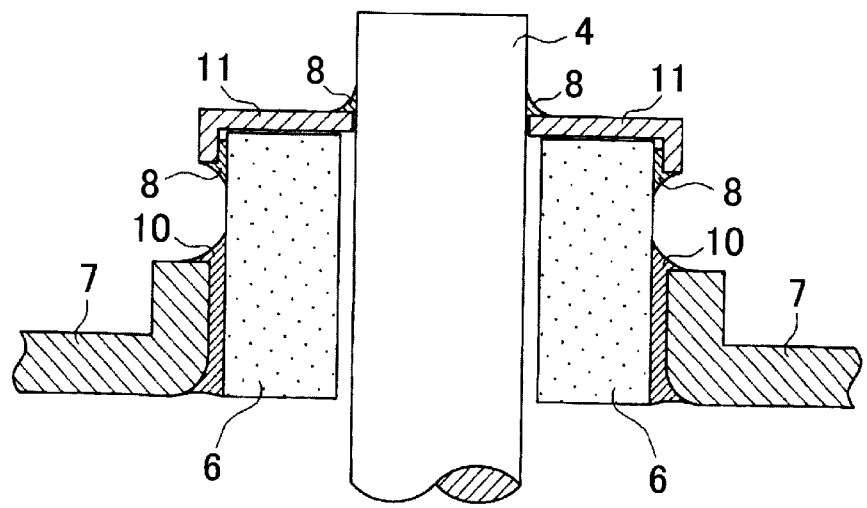
FIG. 5 is a partially enlarged longitudinal cross-sectional view of an insulating seal arrangement for the positive terminal according to a second embodiment of the invention.

According to this embodiment, as shown in the example of the positive terminal 4 in FIG. 5, the metallic ring 11 is formed by bending downwardly the outer edge of a toroidal metallic plate so as to accommodate the upper end of the insulating sleeve 6 therein. The metallic ring 11 thus shaped exerts a compression force on the upper end of the insulating sleeve 6 when the positive terminal 4 or metallic ring 11 is shrinked due to a decrease in temperature. However, since the ceramic insulating sleeve 6 has a relatively high resistance to compression force, the possibility that a crack occurs in the insulating sleeve 6 is prevented.

Figure 6:
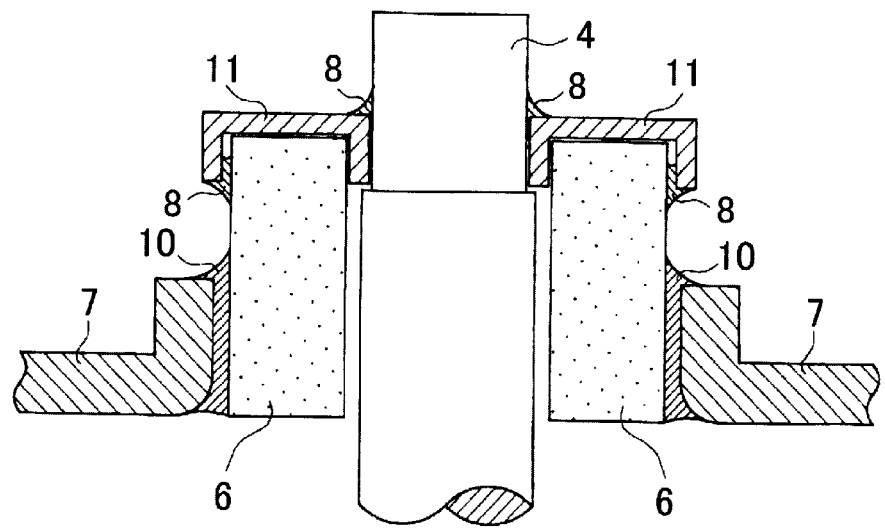
FIG. 6 is a partially enlarged longitudinal cross-sectional view of an insulating seal arrangement for the positive terminal according to the second embodiment of the invention, the arrangement including a metallic ring different in shape from that in FIG. 5.

As shown in the example of the positive terminal 4 in FIG. 6, the metallic ring 11 may be formed by bending downwardly, in addition to the outer edge of the toroidal metallic plate, the inner edge thereof to be fitted over the positive terminal 4 so as to accommodate the upper end of the insulating sleeve 6 between these bent portions.

[Third Embodiment]

Now, a third embodiment of the invention will be described with reference to FIGS. 7 and 8. The same components as in the first embodiment are assigned the same reference numerals and any overlap of description thereof will be avoided. Differences between the embodiments will be described.

Figure 7:
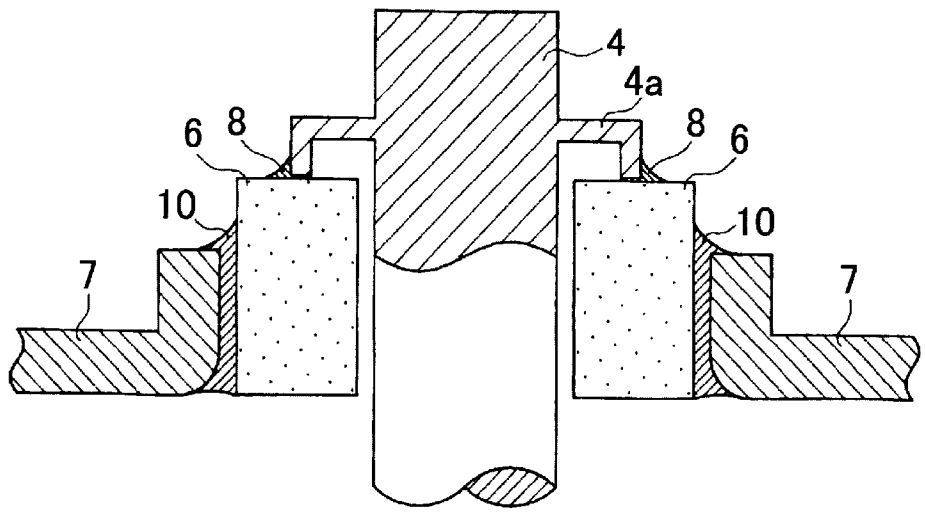
FIG. 7 is a partially enlarged longitudinal cross-sectional view of an insulating seal arrangement for the positive terminal according to a third embodiment of the invention.
Figure 8:
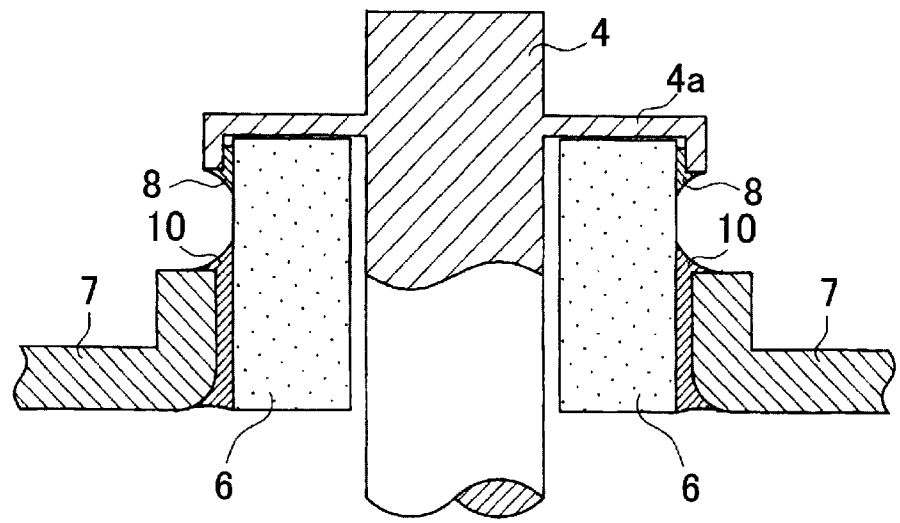
FIG. 8 is a partially enlarged longitudinal cross-sectional view of an insulating seal arrangement for the positive terminal according to the third embodiment of the invention, the arrangement including a metallic ring different in shape from that in FIG. 7.

According to this embodiment, a metallic ring portion 4a is used as shown in FIG. 7, instead of the metallic ring 11 fitted over the positive terminal 4. The metallic ring 4a is formed by bending downwardly the outer edge of a circular flange extending from the outer surface of the positive terminal 4, and is L-shaped in cross section as in the case with the metallic ring 11 in the first embodiment. Thus, even if, when the temperature varies, a dimension of the gap between the positive terminal 4 and the insulating sleeve 6 changes to cause a distortion due to the difference in coefficient of thermal expansion between the aluminum alloy or the like and ceramic, the distortion can be accommodated by the cylindrical part of the metallic ring portion 4a being deflected, as in the case of the metallic ring 11.

In addition, since such a metallic ring portion 4a need not to be brazed to the positive terminal 4 with the brazing metal 8, the labor that would otherwise be required can be saved, and the insulating seal arrangement can be enhanced in reliability.

As in the case of the metallic ring 11 in the second embodiment, the metallic ring portion 4a may be formed by bending downwardly the outer edge of a circular plate so as to accommodate the upper end of the insulating sleeve 6 therein. FIG. 8 shows an example of the insulating seal arrangement incorporating the metallic ring portion 4a thus shaped. If such a metallic ring portion 4a is used, even if the positive terminal 4 is shrinked due to a decrease in temperature, and the metallic ring portion 4a exerts a compression force on the upper end of the insulating sleeve 6, the possibility that a crack occurs in the insulating sleeve 6 is prevented because the ceramic insulating sleeve 6 has a relatively high resistance to compression force.

[Fourth Embodiment]

The metallic ring 11 preferably has a strength enough to support the terminal 4 or 5. In addition, in order to readily accommodate distortions of the terminals 4, 5 and insulating sleeve 6 caused by the difference in coefficient of thermal expansion therebetween, the metallic ring 11 is preferably made of a metallic material that is susceptible to elastic deformation.

However, sometimes, selecting the material of the metallic ring 11 in consideration of the strength and elasticity inevitably leads to an inferior corrosion resistance. For example, if the material of the metallic ring 11 at the positive terminal 4 is selected in consideration of strength and elasticity, there is sometimes no choice but to adopt an aluminum alloy for the metallic ring 11 which is inferior in corrosion resistance to an aluminum alloy used for the positive terminal 4. Similarly, as for the metallic ring 11 made of a copper alloy at the negative terminal 5, there is sometimes no choice but to adopt a copper alloy for the metallic ring which is inferior in corrosion resistance to a copper alloy used for the negative terminal 5.

The brazing metals 8, 9 for brazing the metallic ring 11 to the terminals 4, 5 or insulating sleeve 6 is required to have a melting point lower than those of the metallic materials of the terminals 4, 5 and metallic ring 11. Therefore, there is sometimes no choice but to adopt a brazing metal which is inferior in corrosion resistance to the metallic materials of the terminals 4, 5.

Under such a circumstance, there is a possibility that the metallic ring 11 or brazing metal 8 or 9 is corroded when it is bought into contact with the non-aqueous electrolyte at the potential of the positive or negative electrode.

In addition, if the corrosion develops at the regions to degrade air tightness of the battery during use, an additional problem may arise in that water is introduced into the battery and reacts with an active material (lithium, for example) to reduce the battery capacity or increase the internal resistance of the battery, which leads to decrease of the life of the battery.

Thus, in fourth to sixth embodiments below, arrangements for hermetically sealing the gaps between the positive terminal 4 and negative terminal 5 and the insulating sleeve 6, which are adapted to solve these problems, will be described in detail.

The fourth embodiment of the invention will be described with reference to FIGS. 9 and 10. The same components as in the first embodiment are assigned the same reference numerals and any overlap of description thereof will be avoided. Differences between the embodiments will be described.

According to the fourth embodiment, a film (protective film 12) made of a protective material is formed on a surface of a metallic ring 11b that is fitted over the positive terminal 4 from bottom. The protective film 12 is preferably formed to cover the surface of a brazing metal 8b, besides the surface of the brazing metal 11b. In this embodiment, a surface of the positive terminal 4 close to the edge of the brazing metal 8b and a surface of the insulating sleeve 6 close to the edge of the brazing metal 8b are also partly covered with the protective film 12. Here, it is essential only that the protective film 12 covers at least one of the metallic ring 11b and the brazing metal 8b.

The protective film 12 may be a metallic film, resin film or ceramic film. If the protective film 12 is to be made of metal, the metallic material of the protective film 12 has a corrosion resistance higher than that of the metallic ring 11 or brazing metal 10, preferably more than equivalent to that of the metallic material of the positive terminal 4.

The film is typically formed by plating. However, the method for forming the film is not limited to a particular one. Here, in the case of electroplating, any plating layer is not formed on the surface of the insulating sleeve 6. The plating layer may be a gold plating, which has a high corrosion resistance, for example. The protective film 12 for the negative terminal 5 may be a nickel plating.

A resin protective film 12 may be formed by coating of a resin having a high corrosion resistance, such as polyimide, parylene, polyolefine, polyester, and fluororesin.

A ceramic protective film 12 is mainly made of ceramic having a high corrosion resistance, and can be formed by thermal spraying, spray coating or the like at a relatively low temperature. Two or more kinds of film materials can be used together. For example, coating the surface of the ceramic or metal film with the resin film having a higher corrosion resistance can provide a protective film 12 that is more reliable than the film made of a single material.

As in the prior art example, the insulating sleeve 6 is hermetically fixed to the terminal supporting plate 7 in such a manner that it is inserted in the opening in the terminal supporting plate 7 and the seam therebetween is brazed with the brazing metal 10. The protective film 12 may cover the brazing metal 10 and the lower surface of the terminal supporting plate 7.

In the arrangement described above, the protective film 12 is formed on the surface of the metallic ring 11b that is fitted over the lower part of the positive terminal 4 and exposed to the inside of the battery sheath. Therefore, the metallic ring 11b at the potential of the positive electrode is not brought into direct contact with the non-aqueous electrolyte, and thus, is not corroded.

In addition, since the lower metallic ring 11b blocks the non-aqueous electrolyte from entering into the gap between the positive terminal 4 and the insulating sleeve 6, a metallic ring 11a fitted over the positive terminal 4 from above is not brought into contact with the non-aqueous electrolyte, and there is no possibility that it is corroded.

In addition, since the surface, exposed to the inside of the battery sheath, of the brazing metal 8b for hermetically fixing the metallic ring 11b to the positive terminal 4 or insulating sleeve 6 is also covered with the protective film 12, it is not brought into contact with the non-aqueous electrolyte and corroded thereby. Therefore, the non-aqueous electrolyte secondary battery according to this embodiment has an improved air tightness at the part of the positive terminal 4 which is hermetically fixed to the metallic ring, and the battery life is elongated.

In the fourth embodiment, since the metallic ring 11b is not brought into direct contact with the non-aqueous electrolyte, the metallic ring 11b at the positive electrode may be made of kobar, 42% nickel-iron alloy or stainless steel, which is slightly inferior to the material of the positive terminal 4 in corrosion resistance to the non-aqueous electrolyte at the potential of the positive electrode. As for the metallic ring 11 at the negative electrode, the lower metallic ring (referred to as a metallic ring 11b, hereinafter) may be made of a copper alloy or the like which is equivalent to or inferior to the negative terminal 5 in corrosion resistance. Furthermore, the metallic ring 11b may be made of another metallic material selected in consideration of strength, elasticity or the like, without being limited to these metallic materials.

Furthermore, if the protective film 12 is formed on the surface of the brazing metal (8b in the case of the shown positive electrode) for hermetically fixing the metallic ring 11b to the terminal 4 or 5 or insulating sleeve 6, the material of the brazing metal can be arbitrarily selected. The brazing metal used for the terminal 4, 5 may be different from the brazing metal used for the insulating sleeve 6. In an application in which high reliability is required, it is preferred that a brazing metal having a high corrosion resistance is used and the protective film 12 is formed on the surface thereof.

Figure 9:
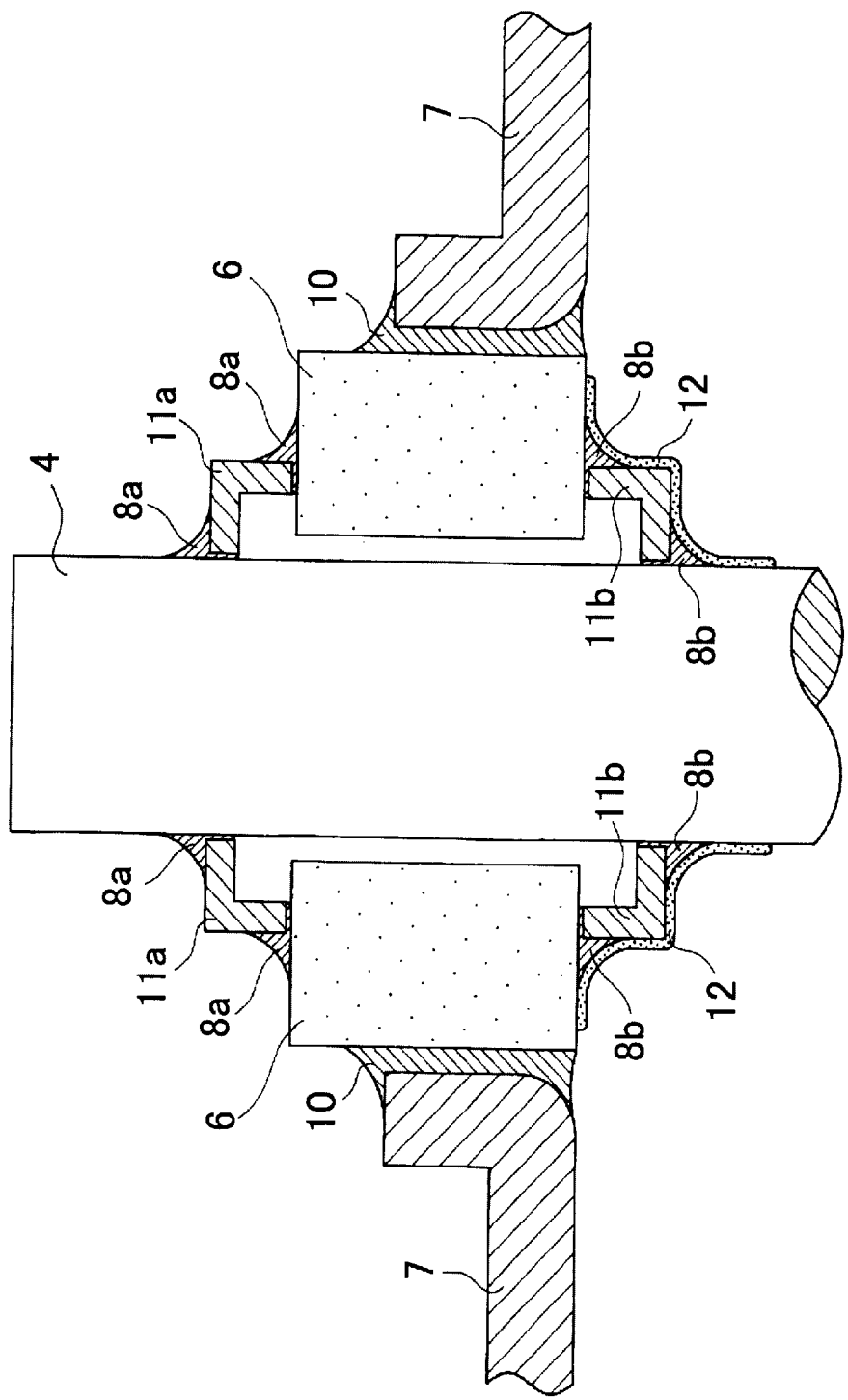
FIG. 9 is a partially enlarged longitudinal cross-sectional view of an insulating seal arrangement for the positive terminal according to a fourth embodiment of the invention.
Figure 10:
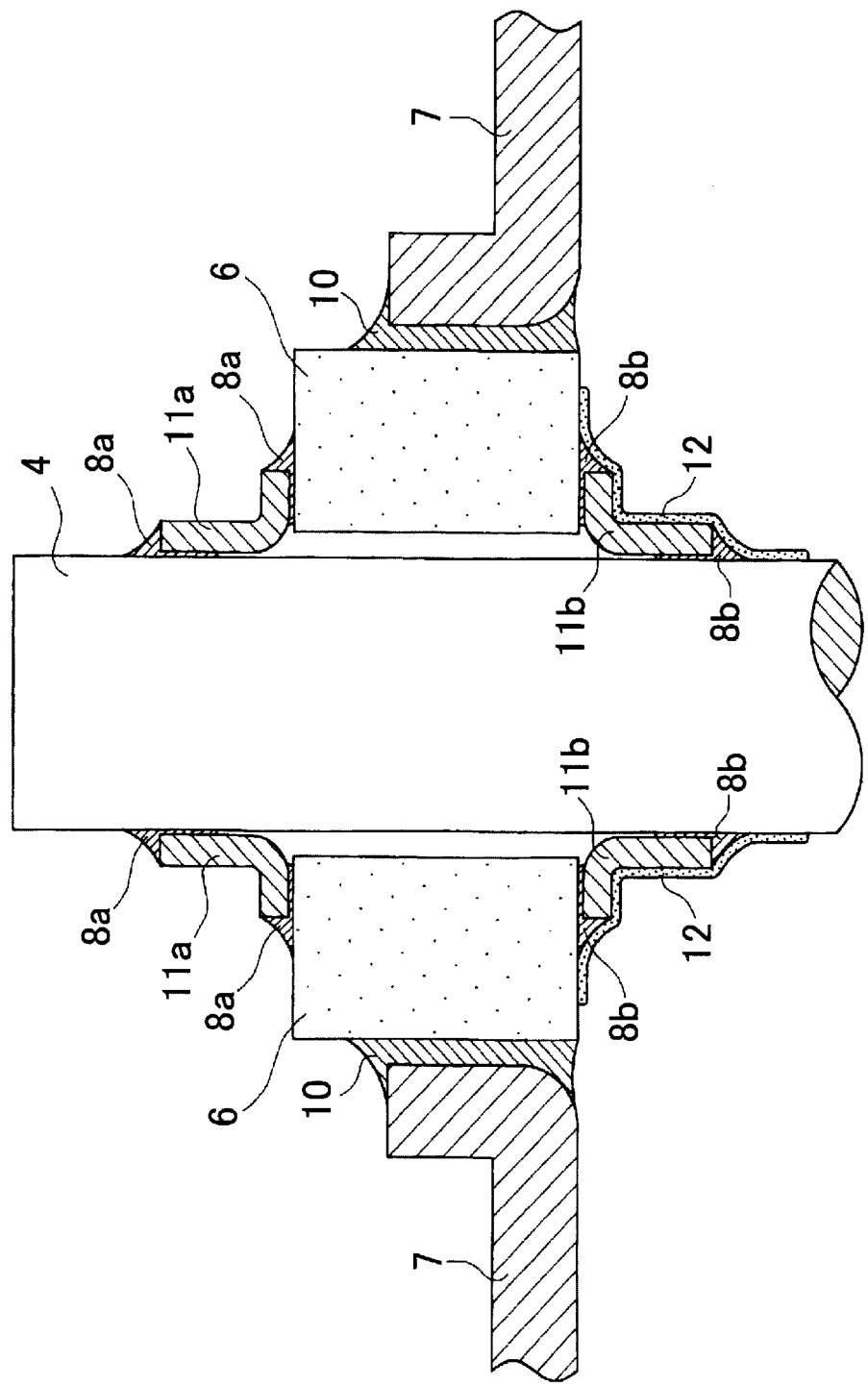
FIG. 10 is a partially enlarged longitudinal cross-sectional view of an insulating seal arrangement for the positive terminal according to the fourth embodiment of the invention, the arrangement including metallic rings different in shape from those in FIG. 9.

In the fourth embodiment, the metallic ring 11 that is L-shaped in cross section, which is formed by bending inwardly a section of a metallic cylinder close to one edge thereof as shown in FIG. 9, has been described. However, as shown in FIG. 10, the metallic ring 11 that is L-shaped in cross section, which is formed by bending outwardly a section of the metallic cylinder close to one edge thereof, may be used.

[Fifth Embodiment]

Figure 13:
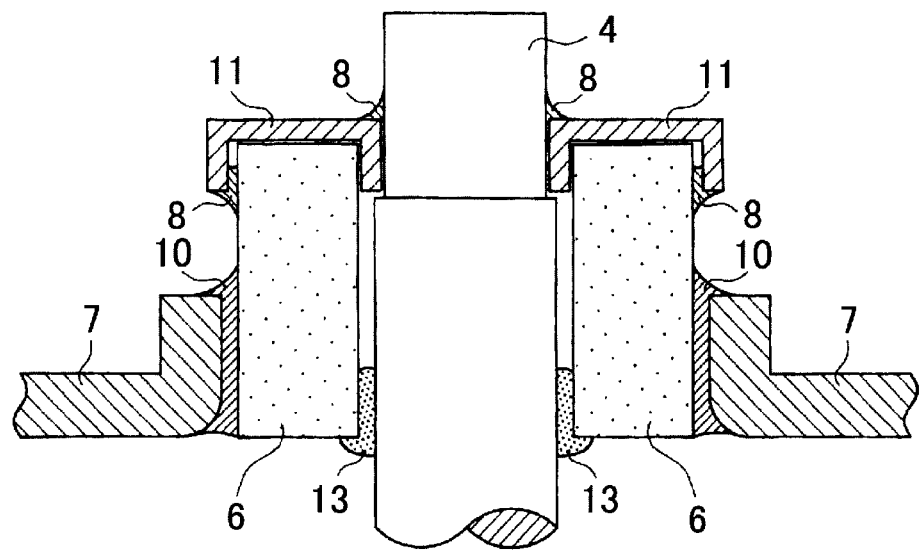
FIG. 13 is a partially enlarged longitudinal cross-sectional view of an insulating seal arrangement for the positive terminal according to the fifth embodiment of the invention, the arrangement including a metallic ring different in shape from that in FIG. 11 or 12.

Now, a fifth embodiment of the invention will be described with reference to FIGS. 11 and 13. The same components as in the first embodiment are assigned the same reference numerals and any overlap of description thereof will be avoided. Differences between the embodiments will be described.

According to this embodiment, the protective film 12 is not involved, and the gap between the insulating sleeve 6 and the positive terminal 4 or negative terminal 5 is filled with a protective filler 13. In this embodiment, as shown in FIGS. 11 to 13, only one metallic ring 11 is disposed on the upper end face of the insulating sleeve 6, that is, an exterior surface of the battery sheath.

According to this embodiment, only one metallic ring 11 is disposed on the upper end face of the insulating sleeve 6, that is, the exterior surface of the battery sheath, and the gap between the insulating sleeve 6 and the positive terminal 4 is filled with the protective filler 13 in the battery sheath.

As is the case with the protective film 12, the protective filler 13 may be made of metal, resin, ceramic or a combination of two or more kinds of materials selected from these materials. In order to facilitate the filling operation, in general, ceramic protective materials are preferred over metal or resin protective materials.

According to this embodiment, the gap between the terminal 4, 5 and the insulating sleeve 6 is filled with the protective filler 13 and the non-aqueous electrolyte is blocked from passing through the gap to reach the parts of the upper metallic ring 11 which are hermetically fixed to the terminal and insulating sleeve. Thus, the metallic ring 11 and brazing metals 8, 9 at the potential of the positive or negative electrode are not brought into contact with the non-aqueous electrolyte and corroded.

In this embodiment, a case where only one metallic ring 11 is disposed on the upper end face of the insulating sleeve 6, that is, the exterior surface of the battery sheath has been described. However, the metallic ring 11 may be interposed between the terminal 4, 5 and the insulating sleeve 6. Furthermore, the number of metallic rings 11 used in this embodiment is not limited. If multiple metallic rings 11 are used, the gap located on the inner side of the innermost metallic ring 11, that is, the gap between the terminal 4, 5 and the insulating sleeve 6 is filled with the protective filler 13.

Figure 11:
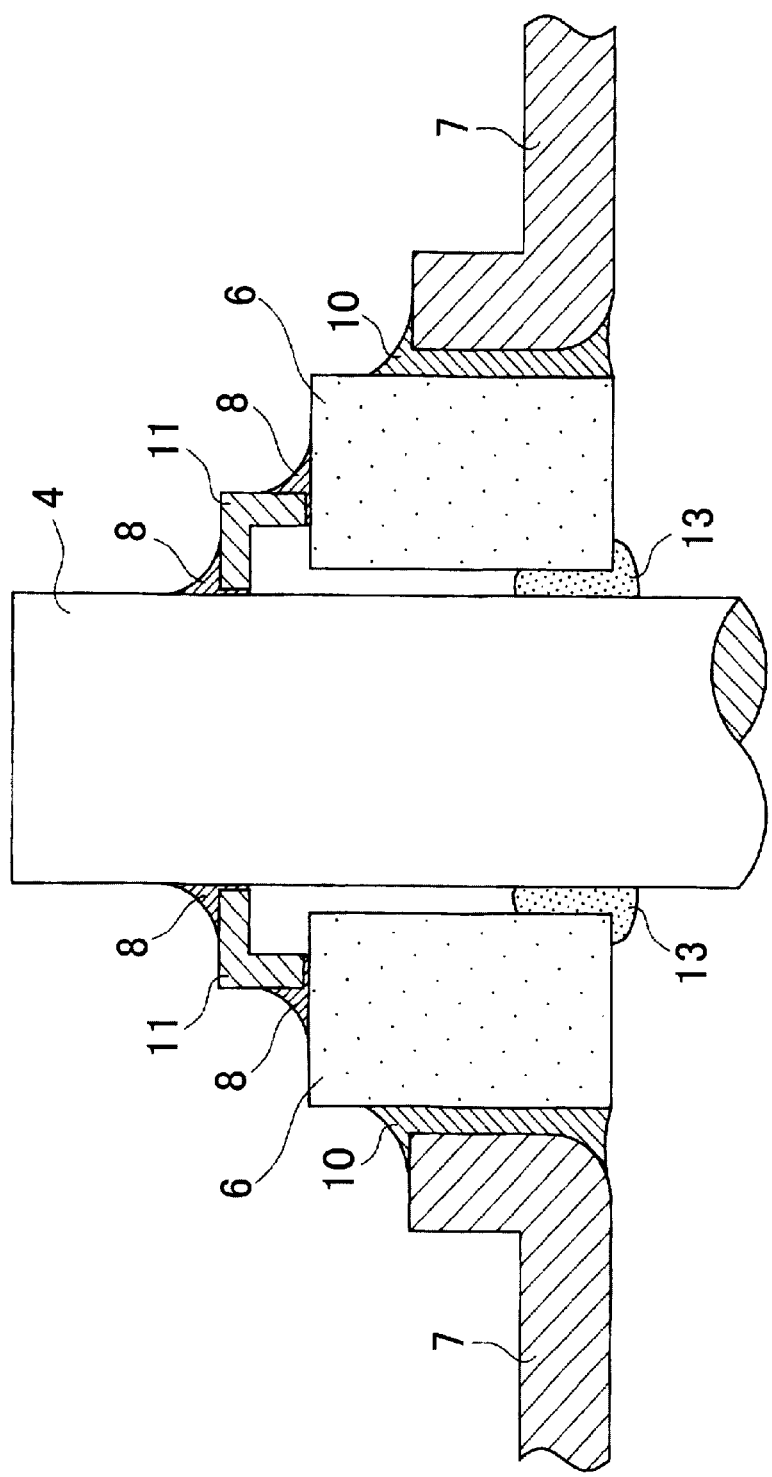
FIG. 11 is a partially enlarged longitudinal cross-sectional view of an insulating seal arrangement for the positive terminal according to a fifth embodiment of the invention.
Figure 12:
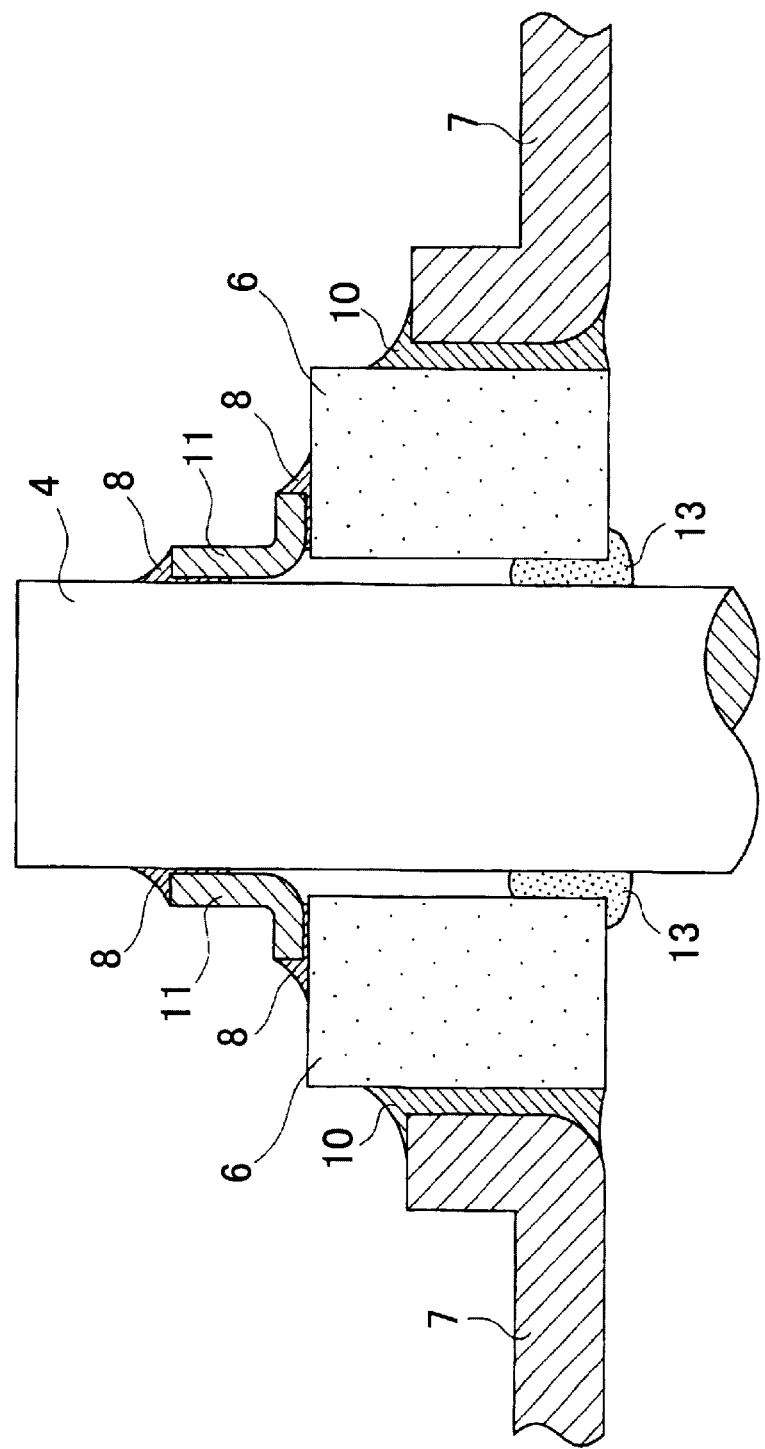
FIG. 12 is a partially enlarged longitudinal cross-sectional view of an insulating seal arrangement for the positive terminal according to the fifth embodiment of the invention, the arrangement including a metallic ring different in shape from that in FIG. 11.

Not only the metallic ring 11 that is L-shaped in cross section, which is formed by bending inwardly a section of a metallic cylinder close to one edge thereof, shown in FIG. 11, but also the metallic ring 11 that is L-shaped in cross section, which is formed by bending outwardly a section of the metallic cylinder close to one edge thereof, shown in FIG. 12 can be used. As shown in FIG. 13, the metallic ring 11 may be formed by bending downwardly the outer and inner edges of a toroidal metallic plate. In this case, the metallic ring 11 is disposed so as to accommodate the upper end of the insulating sleeve 6 between the bent portions.

[Sixth Embodiment]

Figure 14:
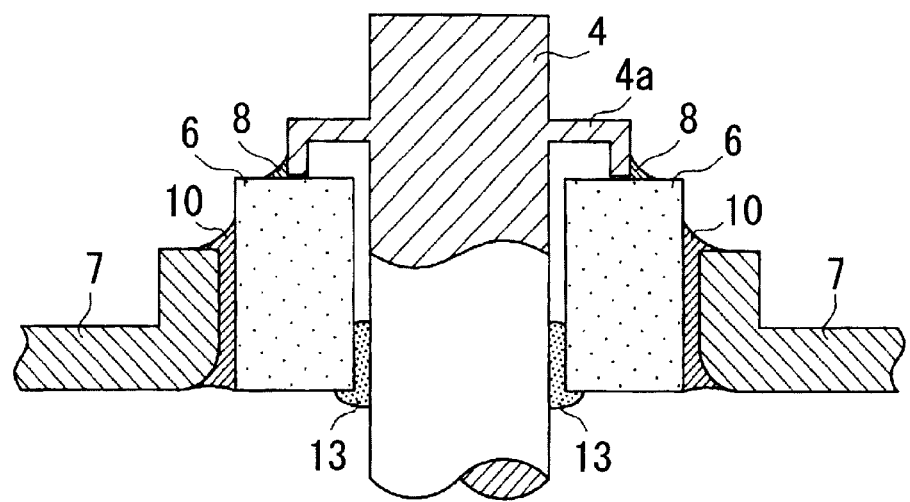
FIG. 14 is a partially enlarged longitudinal cross-sectional view of an insulating seal arrangement for the positive terminal having a metallic ring portion according to a sixth embodiment of the invention.
Figure 15:
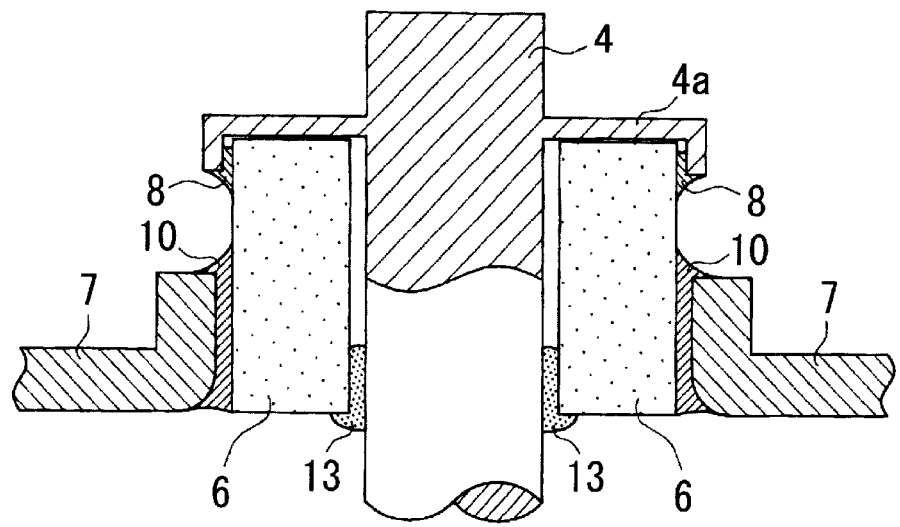
FIG. 15 is a partially enlarged longitudinal cross-sectional view of an insulating seal arrangement for the positive terminal having a metallic ring portion different in shape from that in FIG. 14 according to the sixth embodiment of the invention.

A sixth embodiment of the invention will be described with reference to FIGS. 14 and 15. The same components as in the third embodiment are assigned the same reference numerals and any overlap of description thereof will be avoided. Differences between the embodiments will be described.

According to this embodiment, the gap between the insulating sleeve 6 and the positive terminal 4 is filled with the protective filler 13 inside the battery sheath. The protective filler 13 may be the same as in the fifth embodiment.

As in the fifth embodiment, according to this embodiment, the gap between the terminal 4, 5 and the insulating sleeve 6 is filled with the protective filler 13 and the non-aqueous electrolyte is blocked from passing through the gap to reach the part of the upper metallic ring portion 4a which is hermetically fixed to the insulating sleeve 6. Thus, the brazing metals 8, 9 at the potential of the positive or negative electrode are not brought into contact with the non-aqueous electrolyte and corroded. In this embodiment, the location of the metallic ring portion 4a is not limited to a particular one.

[Seventh Embodiment]

A seventh embodiment of the invention will be described with reference to FIG. 16. The same components as in the first embodiment are assigned the same reference numerals and any overlap of description thereof will be avoided. Differences between the embodiments will be described.

The seventh embodiment has been found based on the following knowledge. That is, a detailed research concerning why a crack occurs in the brazing material has proved that, when the brazing material is cooled, a void (shrinkage cavity) is produced in the brazing material at the root of the terminal protruding from the insulating sleeve due to volumetric shrinkage of the brazing material, and the void causes occurrence of a crack. Referring to the prior art example in FIG. 8, a void is produced in the brazing material at a region 8C.

Thus, according to the seventh embodiment, a metallic ring is previously provided at the region where a void tends to occur to prevent occurrence of any void.

The battery sheath of the non-aqueous electrolyte secondary battery is arranged essentially the same as that illustrated in the first embodiment.

Figure 16:
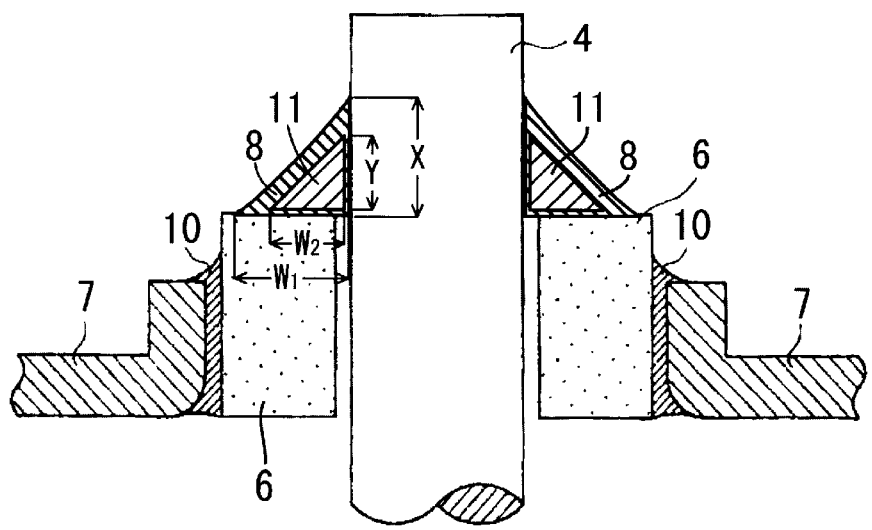
FIG. 16 is a partially enlarged longitudinal cross-sectional view of an insulating seal arrangement for the positive terminal according to a seventh embodiment of the invention.

The positive terminal 4 is inserted in the ceramic insulating sleeve 6 from bottom as shown in FIG. 16.

A metallic ring 11 that is substantially right triangular in cross section and has a circular hole for passing the positive terminal 4 therethrough is fitted over the positive terminal with the bottom surface facing the upper end face of the insulating sleeve 6. The outer diameter of the bottom surface of the metallic ring 11 is smaller than that of the insulating sleeve 6, so that a brazing material can be placed on a part of the upper end face of the insulating sleeve 6.

In this state, brazing is performed in such a manner that the entire inclined side surface of the metallic ring 11 is covered with the brazing material and the brazing material adheres to the positive terminal 4 and the insulating sleeve 6. As a result, the positive terminal 4 and the metallic ring 11 are brazed to each other, and the metallic ring 11 and the insulating sleeve 6 are brazed to each other.

Since the brazing material penetrates into a small gap between the metallic ring 11 and the positive terminal 4, the inner surface of the metallic ring 11 is also brazed to the positive terminal 4. Similarly, the bottom surface of the metallic ring 11 is also brazed to the upper end face of the insulating sleeve 6.

According to the arrangement described above, the metallic ring 11 is provided at the region where a void tends to occur in brazing. Therefore, substantially no void occurs in the brazing metal 8, and accordingly, a crack can be prevented from occurring in the brazing metal 8 with reliability.

The arrangement described above is especially effective in the case where the positive terminal 4 is made of aluminum or an aluminum alloy that has a coefficient of thermal expansion two or more times as high as that of titanium or a titanium alloy.

In this embodiment, the metallic ring 11 that is substantially right triangular in cross section has been described. However, a corner of the triangular metallic ring 11 may have a cut face (C face) or rounded face (R face).

In this embodiment, the size of the metallic ring 11 is preferably specified as follows.

Referring to FIG. 16, provided that the height of the brazing in cross section is denoted by a character X and the height of the metallic ring 11 is denoted by a character Y, the metallic ring 11 preferably has such a size that the height Y is 20% or more of the height X, more preferably, the metallic ring 11 has such a size that the height Y is 30% to 90% of the height X.

This is because a metallic ring 11 having a size out of the range can only provide inadequate void suppression. While the height X of the brazing and the height Y of the metallic ring 11 have been described here, the same holds true for the width of the brazing denoted by a character W1 and the width of the metallic ring 11 denoted by a character W2. That is, the metallic ring 11 preferably has such a size that the width W2 is 20% or more of the width W1, more preferably, the metallic ring 11 has such a size that the width W2 is 30% to 90% of the width W1.

The present invention is not limited to the embodiments described above and illustrated in the drawings. The technical scope of the present invention includes the following embodiments, for example, and besides the following embodiments, the present invention can be modified in various ways without departing from the spirit of the invention.

(1) In the first to seventh embodiments, the battery sheath comprises the metallic case 2, the lid plate 3 and the terminal supporting plate 7. However, the arrangement of the battery sheath is not particularly limited. For example, the insulating sleeve 6 may be directly brazed to the opening in the lid plate 3 without the terminal supporting plate 7. Furthermore, the positive terminal 4 and the negative terminal 5 may be provided directly on the metallic case 2.

Furthermore, the battery sheath itself may serve as the negative terminal 5, so that only the positive terminal 5 may be fixed into an opening in the battery sheath via the insulating sleeve 6. Alternatively, the battery sheath itself may serve as the positive terminal 4, so that only the negative terminal 5 may be fixed into an opening in the battery sheath via the insulating sleeve 6. Furthermore, any battery sheath comprising other than the combination of the metallic case 2 and the lid plate 3 can be similarly implemented.

(2) In the first to seventh embodiments, the non-aqueous electrolyte secondary battery has been described. However, of course, another primary battery or secondary battery may be used. For example, the present invention can be similarly applied to a non-aqueous electrolyte primary battery, polymer primary battery or the like.

The brazing material for brazing of the terminals 4, 5 and metallic ring 11 can be arbitrarily selected according to the type of the battery.

(3) In the first to seventh embodiments, the elliptic-cylindrical battery has been described. However, the shape of the battery is not particularly limited. For example, the battery may be cylindrical or square shaped.

(4) In the first to seventh embodiments, the insulating seal arrangement for the positive terminal 4 has been described with reference to the drawings. However, of course, the same arrangement as that for the positive terminal 4 can be applied to the negative terminal. Furthermore, it goes without saying that the insulating seal arrangement according to the invention may be applied to one of the positive terminal and the negative terminal, or may be applied to both of them.

(5) In the first to sixth embodiments described above, the edge of the metallic ring 11 or metallic ring portion 4a is brazed. However, the part of the metallic ring 11 or metallic ring portion 4a to be brazed is not particularly limited.

(6) In the first to seventh embodiments described above, one or two metallic rings 11 or metallic ring portions 4a are used. However, the number of the metallic rings 11 or metallic ring portions 4a is not particularly limited, and of course, three or more metallic rings or metallic ring portions may be used.

(7) In the first to seventh embodiments described above, the metallic ring 11 or metallic ring portion 4a has various shapes. The shape of the metallic ring 11 is not particularly limited, and the metallic ring 11 has any shape as far as it can accommodate a variation of the shape of the gap between the positive terminal 4 or negative terminal 5 and the insulating sleeve 6 by deformation, such as deflection, thereof.

(8) In the first, second, third and seventh embodiment described above, if the metallic ring 11 or metallic ring portion 4a is disposed only on the upper end face of the insulating sleeve 6, the electrolyte possibly goes up through the gap between the positive terminal 4 or negative terminal 5 and the insulating sleeve 6 and comes into contact with the metallic ring 11, metallic ring portion 4a or brazing metal 8. Therefore, the protective film 12 can be formed to cover the brazing metal 8 adhered to a part possibly brought into contact with the electrolyte, for example, the inner surface 11c and edges of the metallic ring 11 in FIG. 3.

(9) In the fourth to sixth embodiments described above, of course, the protective film 12 may be formed on one of the positive terminal 4 and the negative terminal 5 or on both of them. The protective filler 13 may be applied to one of the positive terminal 4 and the negative terminal 5 or to both of them.

What we claim is:

1. A battery, comprising:
    an insulating sleeve made of ceramic hermetically fixed into an opening in a battery sheath made of metal;
    a metallic terminal inserted in the insulating sleeve; and
    a metallic ring fitted over said metallic terminal,
    wherein said metallic ring and said metallic terminal are hermetically fixed to each other by a brazing metal and the metallic ring and said insulating sleeve made of ceramic are hermetically fixed to each other by a brazing metal.

2. The battery according to claim 1, wherein said metallic ring is fixed to support said metallic terminal at an upper end face and/or lower end face of the insulating sleeve.

3. The battery according to claim 1, wherein a film made of a protective material having a corrosion resistance is formed on at least a surface of said metallic ring, the surface being exposed to the inside of said battery sheath.

4. The battery according to claim 1, wherein a film made of a protective material having a corrosion resistance is formed on at least a surface of said brazing metal for hermetically fixing the metallic ring, the surface being exposed to the inside of said battery sheath.

5. The battery according to claim 3, wherein a film made of a protective material having a corrosion resistance is formed on at least a surface of said brazing metal for hermetically fixing the metallic ring, the surface being exposed to the inside of said battery sheath.

6. The battery according to claim 1, wherein a gap between said metallic terminal and said insulating sleeve made of ceramic is filled with a protective filler having a corrosion resistance, the gap being located to the inner side of said battery sheath compared to the parts of said metallic ring which is hermetically fixed to the metallic terminal and the insulating sleeve.

7. The battery according to claim 1, wherein at least a surface of said metallic ring that is exposed to the outside of the battery is covered with said brazing metal, so that said metallic ring is encapsulated in the brazing.

8. The battery according to claim 7, wherein said metallic ring is a substantially right triangular in cross section.

9. The battery according to claim 1, wherein the brazing on said insulating sleeve is coated with a metalized layer.

10. The battery according to claim 1, wherein said metallic ring on the positive electrode is made of aluminum, an aluminum alloy, titanium, a titanium alloy, kobar, a nickel-iron alloy, stainless steel or nickel-plated iron.

11. The battery according to claim 1, wherein said metallic terminal on the positive electrode is made of aluminum, an aluminum alloy, titanium, a titanium alloy, kobar, a nickel-iron alloy, stainless steel or nickel-plated iron.

12. The battery according to claim 1, wherein said metallic ring on the negative electrode is made of copper, a copper alloy, nickel, a nickel alloy, kobar, a nickel-iron alloy, stainless steel or nickel-plated iron.

13. The battery according to claim 1, wherein said metallic terminal on the negative electrode is made of copper, a copper alloy, nickel, a nickel alloy, kobar, a nickel-iron alloy, stainless steel or nickel-plated iron.

14. The battery according to claim 3, wherein said film made of a protective material is made of metal, resin, ceramic or a combination thereof.

15. The battery according to claim 4, wherein said film made of a protective material is made of metal, resin, ceramic or a combination thereof.

16. The battery according to claim 5, wherein said film made of a protective material is made of metal, resin, ceramic or a combination thereof.

17. The battery according to claim 6, wherein said protective filler made of a protective material is made of metal, resin, ceramic or a combination thereof.

* * * * *